March 13, 1962 D. C. EVANS ETAL 3,025,124
RECORDING SYSTEM
Filed June 6, 1958
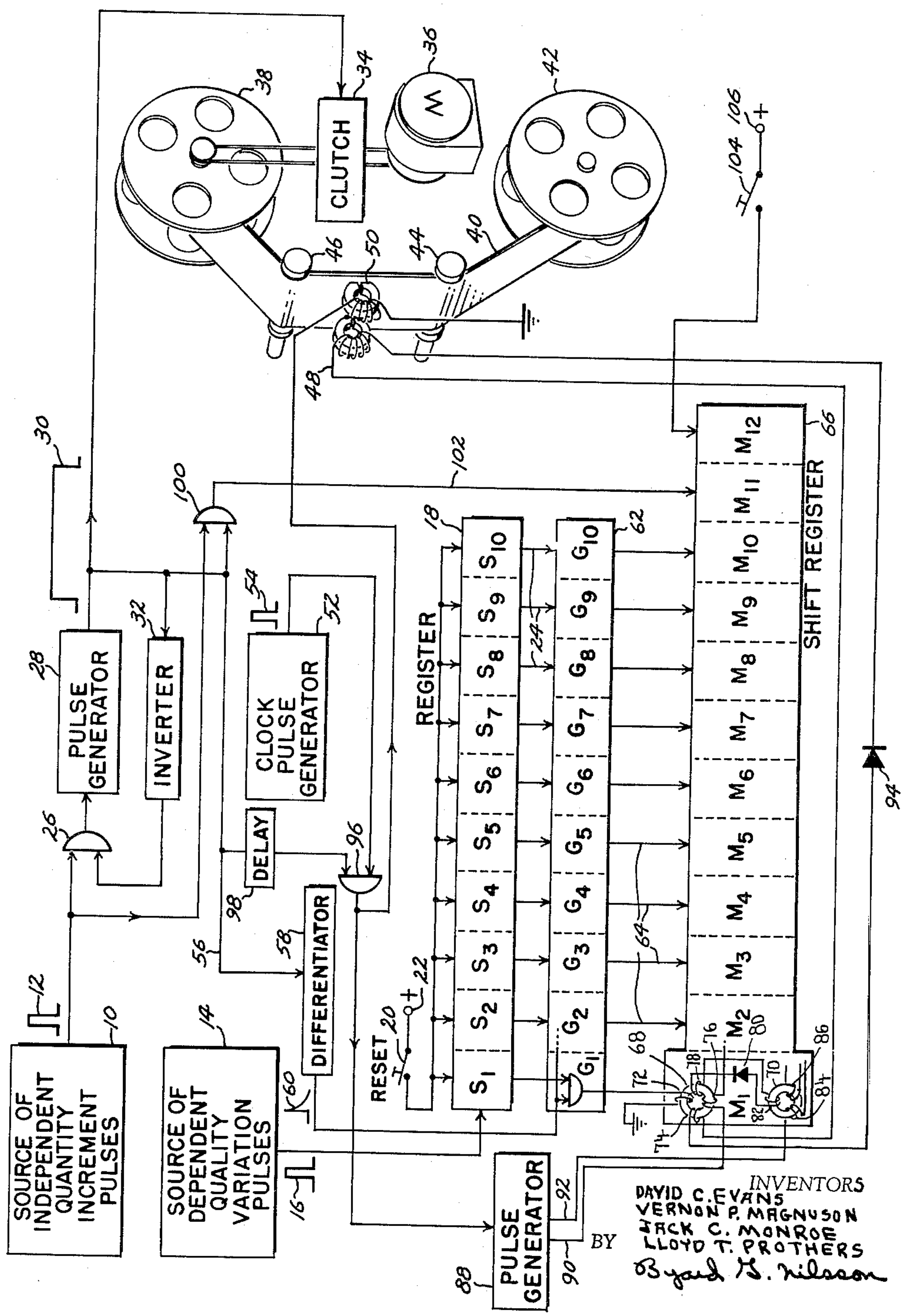
INVENTORS
DAVID C. EVANS
VERNON P. MAGNUSON
JACK C. MONROE
LLOYD T. PROTHERS
BY Byard G. Nilsson 3,025,124
RECORDING SYSTEM David C. Evans, Playa Del Rey, Vernon P. Magnuson, Gardena, Jack C. Monroe, Los Angeles, and Lloyd T. Prothers, Inglewood, Calif., assignors to The Bendix Corporation, Los Angeles, Calif., a corporation of Delaware Filed June 6, 1958, Ser. No. 740,501
5 Claims. (Cl. 346—74)

The present invention relates to a recording system for recording intermittently-occurring intelligence-representing signals, as upon magnetic tape.

In performing various tests, and observing various processes, it is often desirable to provide the data observed from the test or process as a form of electrical signals. In order to preserve this data, it is somewhat customary to record the electrical signals representing the data so that the data may be processed at a later time by computers and other data-processing equipment. One method of recording signals, now widely employed, utilizes magnetic tape which may be variously magnetized and thereby record electrical signals. Conventional magnetic recording methods require that a relative movement occur between the magnetic tape and the recording apparatus. As a result, magnetic tape recorders normally continually move the magnetic tape during all intervals of operation. When magnetic recorders are employed to record signals which occur intermittently, the recorded information density, i.e., amount of information per length of magnetic tape, may become extremely low due to the continual movement of the magnetic tape during intervals when no signals are being received. Of course, it is desirable to obtain as high a recording density upon the magnetic tape as possible, in order to conserve upon tape and minimize the amount of tape which must be handled.

In handling data observed from a process or test, it is often desirable to record only a portion of the observed data, as for example, by recording data taken at certain intervals. In certain situations, it is desirable to record the observed data at equal intervals; however, in other situations it is desirable to record data at varying intervals. In the event the latter system of recording is employed, i.e. data is recorded at varying intervals, the situation may occur in which data should be recorded, however, the recording apparatus has not finished recording the last data to be recorded. In this situation, it would be desirable to have the recorded data include an indication that data which normally would have been recorded was in fact not recorded.

The present invention contemplates a recording system for recording data-representing signals upon a magnetic tape at controlled intervals, wherein the tape is moved only during recording periods. Furthermore, an arrangement is provided for recording the occurrence of data which should have been recorded but which was in fact not recorded. The system of the present invention also incorporates a simplified means for providing recording signals to magnetic recording apparatus.

A major object of the present invention is to provide an improved recording system.

Another object of the present invention is to provide a magnetic recording system capable of recording intermittently-occurring signals with a high recording density upon a magnetic tape.

The single FIGURE is a part perspective and part diagrammatic view of a system constructed in accordance with the present invention.

Referring to the drawing, there is shown a source 10 of pulses 12 which represent increments in an independent quantity. A source 14 of pulses 16 representative of increments (or decrements), in a dependent quantity is also provided. In many situations wherein data is selectively observed only during predetermined intervals, the selection of the intervals of observation is made upon a time basis; therefore, the variations or increments of the dependent quantity occur at regularly spaced intervals. However, in certain other situations it is desirable to periodically observe a dependent quantity at varying time intervals under control of an independent quantity other than time. For example, in the performance of stress-strain tests, it is often desirable to sample or observe the strain after uniform increments of stress. Observation of data in this manner then enables conventional stress-strain curves to be plotted representing the characteristics of material. The situation occurs in observing various other forms of data wherein a dependent quantity is repeatedly observed after uniform increments in an independent quantity other than real time.

As shown in the figure, the source 10 provides pulses 12 representative of variations in an independent quantity, while the source 14 provides pulses 16 representative of variations in a dependent quantity. The system functions to record the accumulated value of the dependent quantity at intervals indicated by variations in the independent quantity. This recorded information may then later be employed to plot a graph of the data, or otherwise employed for control or information purposes.

The construction and operation of the recording system is best understood by considering the sequence of operation under certain assumed conditions, and carrying the description of the apparatus forward as the description of the mode of operation proceeds. The source 14 may provide pulses 16 which are either positive or negative in nature to thereby represent respectively positive and negative variations in the dependent quantity. The pulses 16 are applied to a register 18 formed of stages $S_1$ through $S_{10}$. The register 18 may consist of ten bistable multivibrators arranged to provide a digital counter or register. One form of a counter satisfactory for use as the counter 18 and capable of handling positive and negative pulses is shown and described in United States Patent 2,735,005 to Steele.

In function, the register 18 operates to accumulate pulses which are representative of "ones" and register such pulses in binary code. The stages of the register $S_1$ through $S_{10}$ are each representative of a different binary digit. Therefore, the register 18 is capable of registering ten binary-digit values, that is each stage of the register 18 functions to register one binary digit. Each of the stages in the register 18 is connected through a switch 20 to a terminal 22 that is adapted to receive a positive voltage. Closing the switch 20 therefore applies a voltage to each of the stages $S_1$ through $S_{10}$ in the register 18 that sets these stages in a zero-indicating state. It may therefore be seen, that the closure of the switch 20 resets the register 18 to zero.

Prior to operating the system shown in FIGURE 1, the reset switch 20 will normally be closed temporarily to clear the register 18. After the register 18 is cleared, pulses 16 from the source 14 are counted by the register 18 to thereby manifest the accumulated value of the dependent quantity. The manifestation of the dependent quantity accumulated in the register 18 is made upon lines 24 which are individually connected to the stages $S_1$ through $S_{10}$. The lines 24 receive two-state signals individually from the stages in the register 18. At a time when a line 24 receives a high two-state signal, a one digit is indicated to be present in the stage of the register associated with the particular line. Similarly, if a line 24 receives a low two-state signal a zero digit is indicated to be present in the associated stage of the register 18. For example, if the line 24 emerging from the stage $S_1$ is high a one digit will be indicated to be registered in the least-significant stage of the register 18. Of course, closure of the switch 20 applies a positive voltage to the stages of the register 18 which places these stages in a state wherein the two-state signals appearing on the line 24 are all at a low value.

As the pulses 16 indicating variations in a dependent quantity are accumulated in the register 18, the pulses 12 are passed to a coincidence or "and" gate 26. A gate capable of operating as the gate 26 is shown and described in United States Patent 2,769,971 to C. J. Baske. The symbol employed to represent the gate circuit 26 is used throughout the specification to represent similar gates. These coincidence gates receive a number of two-state signals and provide a single two-state output signal. The output signal is in a high state when all the input signals are in a high state, otherwise, the output signal is in a low state.

The output from the gate 26 is applied to a pulse generator 28 which may take the form of a monostable multivibrator. In function, the pulse generator 28 generates a pulse 30 of substantial duration each time a pulse is received from the gate 26. The pulse 30 is inverted by an inverter 32 and applied as an input to the gate 26. Inverter circuits as the inverter 32, are well-known in the computer art and one such inverter circuit satisfactory for use as the inverter 32 is shown and described in the above-referenced patent to C. J. Baske. The inverter 32 receives a two-state signal including pulses 30 and reverses or inverts this signal to provide a two-state signal which is exactly opposite in state from the input signal. The application of the pulse 30 through the inverter 32 to the gate 26 inhibits the gate 26 during intervals of the pulse 30. Therefore, when the pulse generator has been operated and is forming a pulse 30, the occurrence of a pulse 12 from the source 10 will have no effect upon the pulse generator 28.

The pulse 30 from the pulse generator 28 is applied to a signal-controlled clutch 34 which is mechanically connected between a motor 36 and a reel 38. Electrically-controlled clutches, as the clutch 34 which are normally disengaged but which become engaged upon receiving an electrical signal are well-known in the electro-mechanical art.

During intervals of operation of the system, the motor 36 operates continuously; however, the clutch 34 couples the motor 36 to drive reel 38 only during intervals of the pulse 30. Upon the occurrence of a pulse 30, the reel 38 is driven by the motor 36 to draw magnetic tape 40 from a reel 42 to idlers or capstans 40 and 42 so that the tape 40 is contiguous to magnetic recording heads 48 and 50. It may therefore be seen, that the occurrence of a pulse 12 from the source 10, indicating a variation in the independent quantity causes a section of predetermined length of the tape 40 to be passed under the heads 48 and 50. Head 50 is at times coupled to a continually-operating pulse generator 52 which provides clock pulses 54 to pass through the head 50 to ground potential. As a result, during periods when the tape 40 is moved under the head 50, clock pulses 54 will be recorded upon the tape 40. It is to be noted, that the duration of the clock pulses 54 is approximately one-sixteenth the duration of pulses 30. During intervals when the tape 40 is in motion and clock pulses are being recorded upon the tape 40 by the head 50, the head 48 functions to record the current value of the dependent quantity as registered in the register 18. The manner in which this information is recorded by the head 48 will now be considered.

The pulse 30 from the pulse generator 28 is applied through a line 56 to a differentiator circuit 58 which forms a short-duration pulse 60 initiated by the leading edge of the pulse 30. Differentiator circuits are, of course, well-known in the prior art and may consist simply of a resistance-capacitance combination. The pulse 60 from differentiator circuit 58 is applied to each of a plurality of gates $G_1$ through $G_{10}$ in a gate block 62. Each of the gate circuits $G_1$ through $G_{10}$ are coincidence or "and" gates, as previously described. The gate circuits $G_1$ through $G_{10}$ are individually coupled to the stages $S_1$ through $S_{10}$ respectively in the register 18. Therefore, each of the gate circuits $G_1$ through $G_{10}$ is adapted to receive pulses 60 from a differentiator 58, and information signals through a line 24 from a stage in the register 18. It may therefore be seen, that upon the occurrence of the pulse 30, to cause the pulse 60 to be formed by the differentiator circuit 58, each of the gate circuits $G_1$ through $G_{10}$ will pass the two-state information signal received from an associated stage in the register 18 to a line 64 connected to a memory element $M_1$ through $M_{10}$ in a shift register 66. The memory elements $M_1$ through $M_{12}$ may comprise magnetic core elements formed into a register as shown and described in United States Patents 2,708,722 to An Wang and 2,654,080 to F. A. Browne. The memory element $M_1$ in the register 66 is shown in detail and is similar to the other memory elements $M_2$ through $M_{12}$. The memory elements $M_1$ through $M_{12}$ contain a pair of magnetic cores 68 and 70 formed of magnetic material having a relatively rectangular hysteresis loop. The core 68 carries the following windings: an input winding 72 and output winding 74, a shift winding 76 and a coupling winding 78 to the core 70. The coupling winding 78 is serially connected with a diode 80 and a winding 82 carried by the core 70. The core 70 also has a shift winding 84 and an input winding 86. In the operation of the register 66, each of the memory elements $M_1$ through $M_{12}$ contain two magnetic cores, one of which functions only during the shift operati onto act as a temporary storage. The details of operation of a register of this type is fully described in the above-referenced Wang patent; however, in general the operation is to shift the content of a core similar to the core 68 into a less-significant stage wherein this information is registered in a core coinciding to core 70. The information is held in the core 70 temporarily while all the cores similar to core 68 are cleared then the information is placed in the cores coinciding to core 68. In order to perform this shifting operation two time-disposed pulses are required. These pulses are formed by a pulse generator 88. The pulse generator 88 functions to receive a single pulse and generate properly spaced separate pulses which are applied to lines 90 and 92. The line 92 is then connected to the shift winding associated with each of the cores coinciding to core 68 and the line 90 is connected to each of the shift windings 84 as shown associated with the core 70. The application of these pulses will cause digital signals to emerge from the shift register via the output winding 74 which is connected in a serial circuit including a diode 94 and the recording head 48. In may therefore be seen, that as information departs from the register 66, the occurrence of a "one" digit will cause a voltage to be induced in the winding 74 which will cause a current to flow through the diode 94 and the recording head 48. This current in the recording head 48 then records the "one" digit upon the magnetic tape 40.

As previously indicated, the shifting of information out of the reigster 66 is effected by pulses from the pulse generator 88. The manner in which the pulse generator 88 is operated will now be considered. The pulse 30 from the pulse generator 28 after passing through the line 56 is applied to a coincidence gate 96 through a delay circuit 98. The delay circuit 98 functions to delay the leading edge and trailing edge of the pulse 30 to allow the value registered in the register 18 to be registered in the shift register 66 prior to initiating any shifting operation. The application of the delayed pulse 30 to the gate circuit 96 allows pulses 54 from the clock pulse generator 52 to pass through the gate 96 to be applied to the pulse generator 88. Therefore, due to the relative periods of the pulses 54 and 30 (approximately 16 to 1), the pulse generator 88 receives some 16 pulses which command some 16 shifting operations in the shift register 66. These shifting operations will initially cause information to be shifted through the memory element $M_1$ to be applied directly to the recording head 48, and if a "one" digit, to be recorded by the head 48. Of course, after the information from the twelve stages in the register 66 have all been shifted out, the remaining shift pulses applied to the register 66 will simply cause zeros, i.e. "no pulses" to appear from the register 66. The extra shifting operations are provided to effect spacing between the recorded values of the dependent quantity. Of course, these spaces may be omitted so that the tape moves to accommodate precisely the number of digits shifted from the register 66.

In view of the above description, it may be seen that the system representing an illustrative embodiment of the present invention functions to receive and accumulate variations in a dependent quantity in a register 18. Then with each occurrence of a variation in the independent quantity, the contents of the register 18 is registered in a shift register 66 after passing through a gate block 62. The digital information registered in the shift register 66 is then shifted out of the register in a serial fashion and recorded upon the tape 40 upon locations of the tape defined and marked by clock pulses which are also recorded on the tape by means of a recording head 50. A record is therefore made which indicates the presence of a "zero" digit by the occurrence of a recorded clock pulse but no recorded information pulse and the occurrence of a "one" digit by recorded digit adjacent a recorded clock pulse. Note, the pulses from the gate 96 are recorded by head 50.

In the operation of the system as described above, a situation may occur where the contents of the shift register 66 is being serially shifted out of that register to be recorded by the recording head 48 when a pulse 12 occurs from the source 10 indicating another variation in the independent quantity. In this situation the register 66 is not prepared to receive the current value of the dependent quantity; therefore, the pulse 12 is prevented from passing to the pulse generator 28 by the gate 26 because the gate 26 receives a low two-state signal from the inverter 32. However, it is often desirable to have the recorded information on the tape 40 indicate that a variation in the independent quantity did occur which did not affect the recording of the current value of the dependent quantity. The manner in which a record is made of this occurrence will now be considered.

The pulse 12, in addition to being applied to the gate circuit 26, is also applied to a gate circuit 100 which also receives the pulse 30 as an input. The gate circuit 100 will therefore be qualified upon the occurrence of a pulse 12 during a recording operation as indicated by the pulse 30, and at this time, the gate 100 will pass a pulse through a line 102 to the memory element $M_{11}$ in the shift register 66. The memory element $M_{11}$ upon receiving a pulse through the line 102 is set in a state to indicate a "one" digit, and when this digit is shifted out of the register 66 and recorded upon the tape 40 beside the eleventh clock pulse in a series, the occurrence of an increment in the independent quantity which could not command the recording of the dependent quantity is indicated. Of course, a plurality of memory elements may be provided in the shift register 66 to cover the contingency that several variations in a dependent quantity may occur during a recording operation which could not effect the recording of the current value of the dependent quantity.

In addition to recording the current value of the dependent quantity, and the indication that a variation in the independent quantity occurred during the recording operation last performed, it is further often desirable to record an indication which will identify a particular value of the dependent quantity. The memory element $M_{12}$ is provided to perform such an operation. The input to the memory element $M_{12}$ is connected through a switch 104 to a terminal 106 adapted to be connected to a source of positive voltage. Therefore, closure of the switch 104 registers a "one" digit in the memory element $M_{12}$. When this "one" digit is shifted from the shift register 66 and recorded upon the tape 40 in the twelfth digit position, an indication is made which identifies that particular value of the dependent quantity.

An important feature of the present invention resides in the operation of the magnetic tape-moving apparatus in an intermittent fashion so that movement is imparted to the tape only during intervals when the tape is to be recorded upon. This feature allows a high recording density to be effected even when recording information-representing signals which occur very infrequently.

Another important feature of the present invention lies in the manner in which variations in the independent quantity are manifested in the recording, either by the presence of the dependent quantity, or by the presence of an actual record recorded with the dependent quantity.

A further feature of importance in the present invention is the structure wherein a magnetic recording head as the head 48, is driven directly by a magnetic core in a magnetic core register.

From the foregoing, it will be apparent to those skilled in the art that this invention provides a greatly improved and very satisfactory recording system, fully capable of achieving certain advantages. It will be apparent, however, that variations may be made in the system without departing from the novel features thereof. Consequently, the invention is not limited to the particular arrangement shown and described except as limited by the claims.

What is claimed is:

1. A system for recording random information signals upon magnetic tape comprising: recording means for recording upon said tape; motivating means controlled by said random information signals for moving said magnetic tape a predetermined distance relative to said recording means; temporary storage means for registering said random information signals and connected to provide signals for recording to said recording means; sensing means for sensing that said tape is being moved; and means for registering a predetermined signal in said temporary storage means upon said tape upon the occurrence of said random information signals to be recorded, during an interval when said tape is being moved.

2. A system for intermittently recording information signals upon magnetic tape comprising: recording means for recording upon said tape; motivating means for moving said magnetic tape relative to said recording means; means adapted to receive randomly-occurring first information signals representative of an independent quantity; accumulator means adapted to receive and accumulate second information signals representative of a dependent quantity; means for applying the accumulated second information signals from said accumulator means to said recording means upon each occurrence of said first signals; and means for operating said motivating means upon each occurrence of said first signals to record the contents of said accumulator means.

3. A system for intermittently recording information signals upon magnetic tape comprising: recording means for recording upon said tape; motivating means for moving said magnetic tape relative to said recording means; means adapted to receive randomly-occurring first information signals representative of an independent quantity; accumulator means adapted to receive and accumulate inforamtion signals representative of a dependent quantity; means for applying the accumulated second information signals to said recording means upon each occurrence of said first signals; means for operating said motivating means upon each occurrence of said first signals; and means for recording a predetermined signal upon said tape upon the occurrence of said first information signals during an integral when said sensing means senses said tape is being moved.

4. A system for intermittently recording information signals upon magnetic tape comprising: recording means for recording upon said tape; motivating means for moving said magnetic tape relative to said recording means; means adapted to receive randomly-occurring first information signals representative of an independent quantity; means adapted to receive and accumulate second information signals representative of a dependent quantity; means for applying the accumulated second information signals to said recording means upon each occurrence of said first signals; means for operating said motivating means upon each occurrence of said first signals; sensing means for sensing that said tape is being moved; and means for recording a predetermined signal upon said tape upon the simultaneous occurrence of said first information signals and said tape being motivated.

5. A recording system wherein the value of a dependent quantity is recorded upon the random occurrence of a predetermined variation in an independent quantity comprising: register means adapted to receive and register signals indicating variations in a dependent quantity to form signals representing said dependent quantity; recording means for recording signals; means for applying the signals in said register means to said recording means upon the occurrence of signals representing a predetermined variation in said independent quantity; and means for registerig signals in said register means upon the occurrence of signals representing a predetermined variation in said independent quantity at a time when said recording means is recording signals.

References Cited in the file of this patent

UNITED STATES PATENTS

| | | |
|---|---|---|
| 2,719,964 | McGuigan et al. | Oct. 4, 1955 |
| 2,768,049 | Geiser | Oct. 23, 1956 |
| 2,818,322 | Blakely | Dec. 31, 1957 |
| 2,927,237 | Zanardo | May 17, 1960 |

OTHER REFERENCES

Article by Findlay, pp. 122–26, February 1956 edition of Electronics.